May 1, 1928.
G. SMITH
FACING AND STACKING MACHINE
Filed Sept. 5, 1924
1,667,956
9 Sheets—Sheet 1
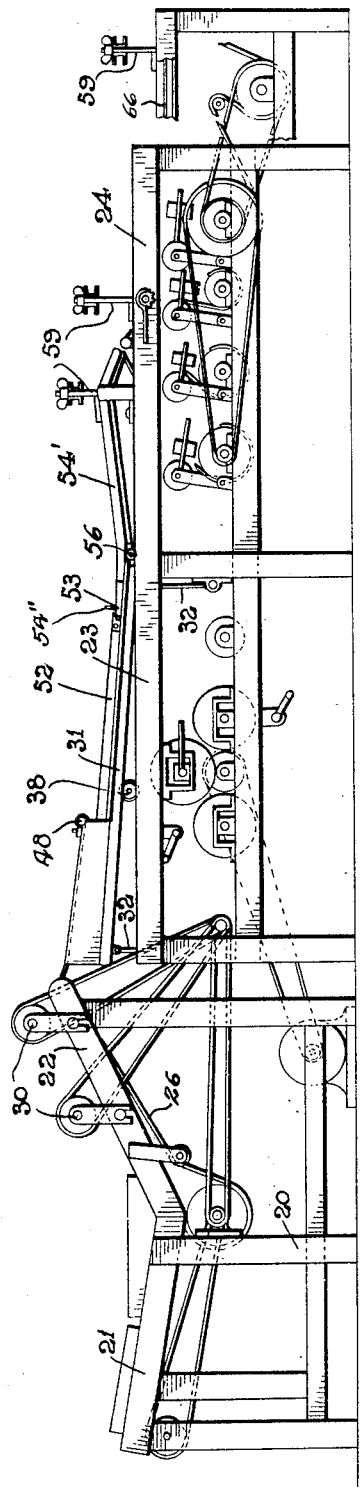
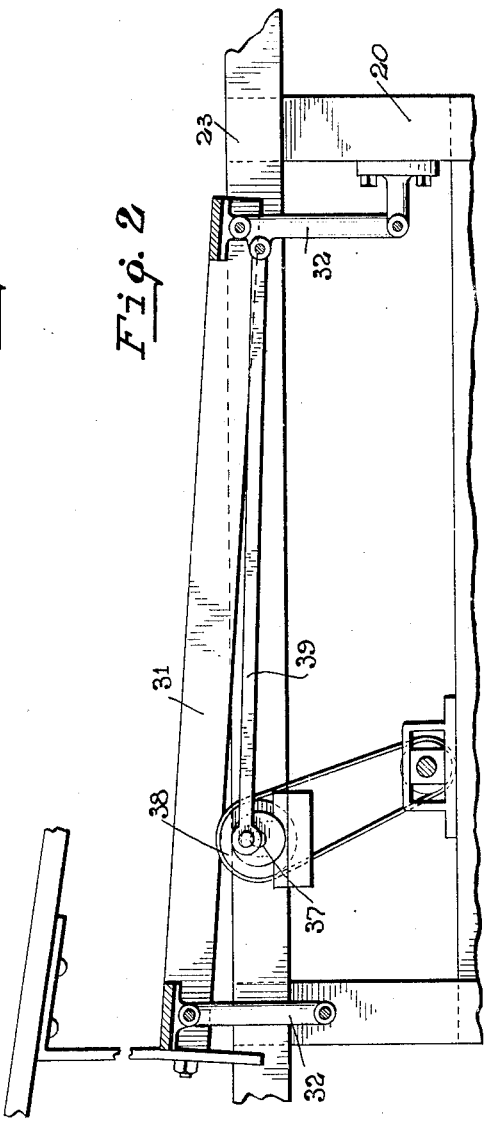
INVENTOR
George Smith
BY
Mayer, Warfield & Watson
ATTORNEY

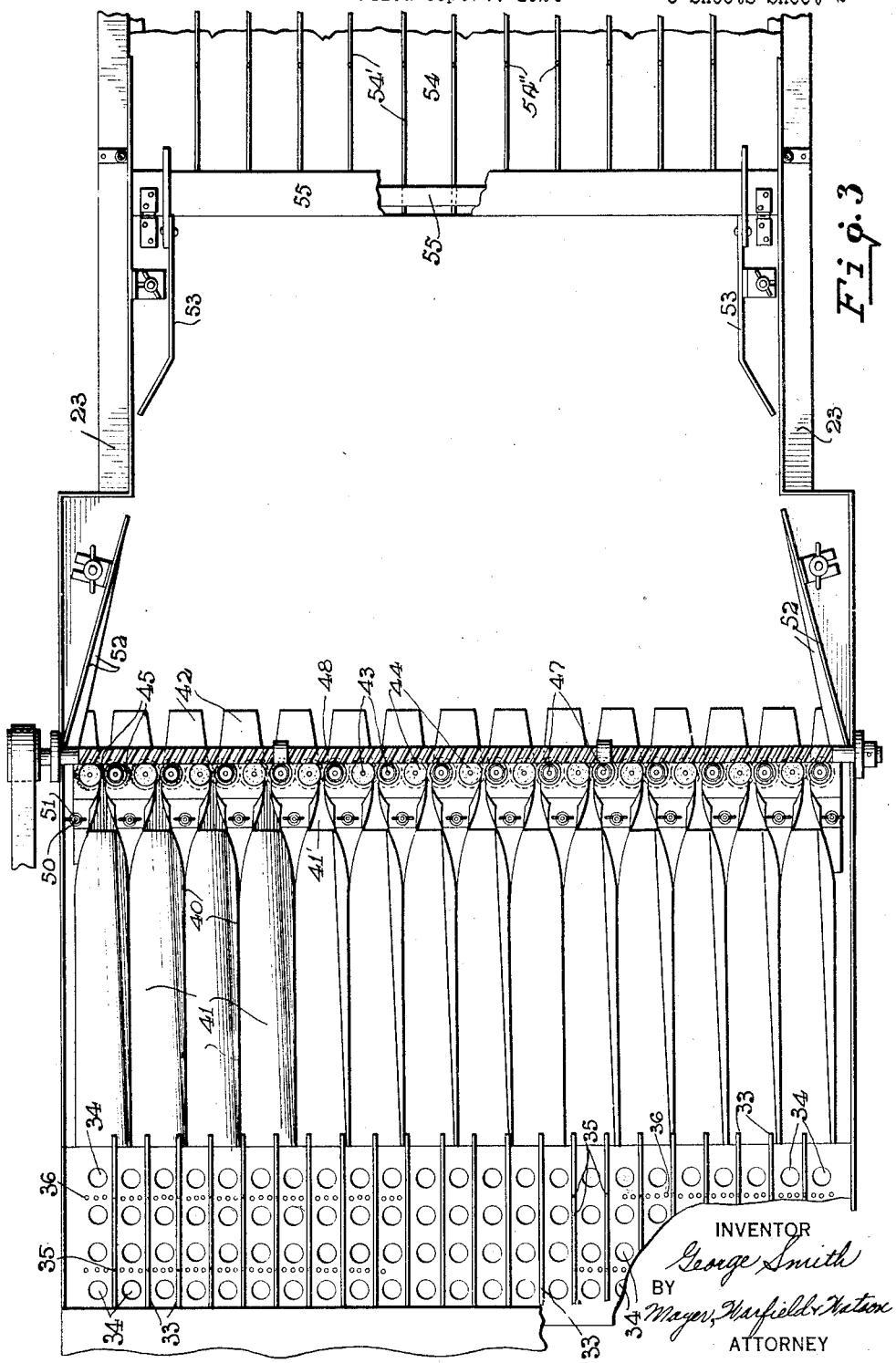

May 1, 1928. 1,667,956
G. SMITH
FACING AND STACKING MACHINE
Filed Sept. 5, 1924 9 Sheets-Sheet 3
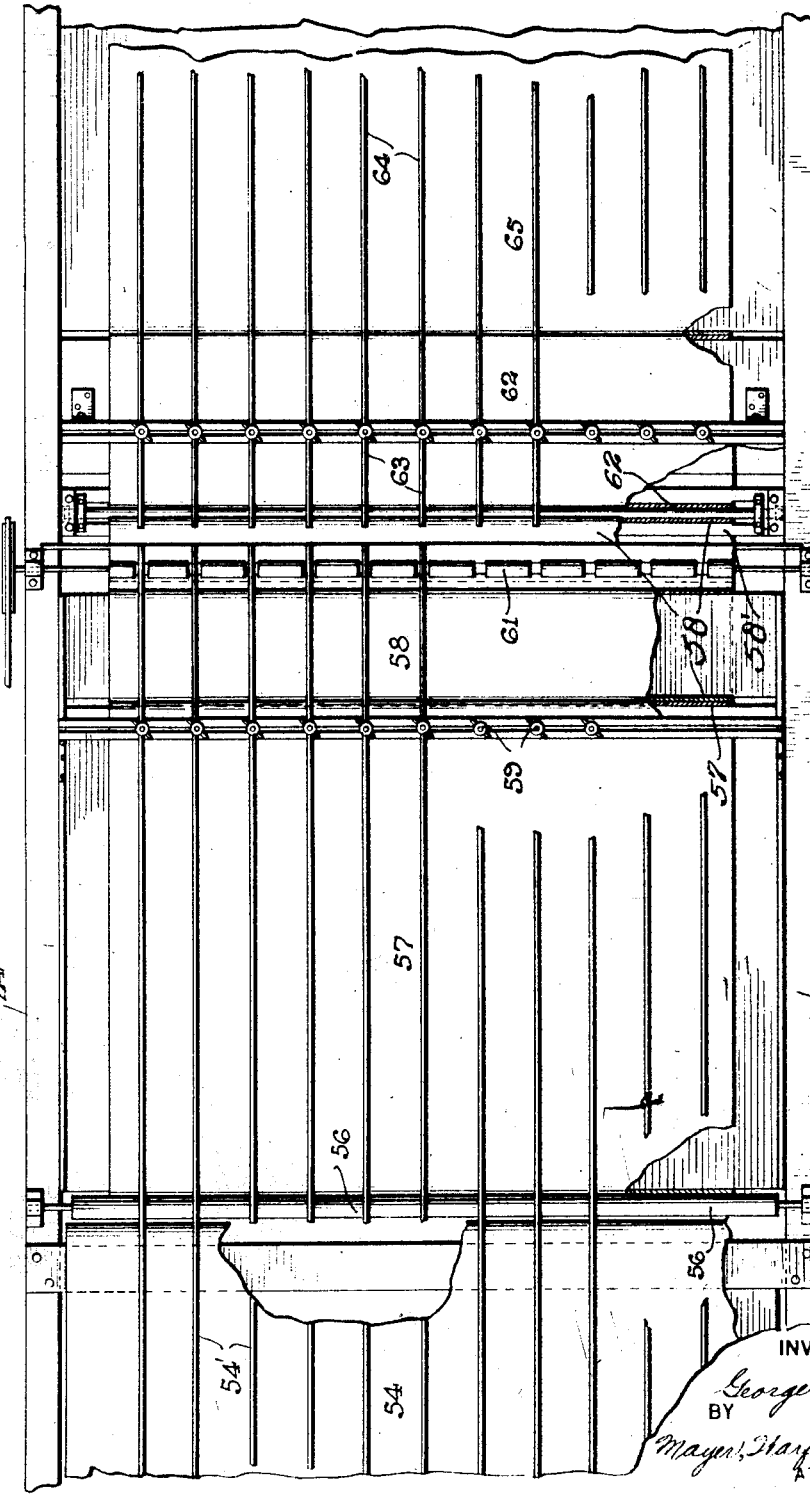

May 1, 1928.

G. SMITH 1,667,956

FACING AND STACKING MACHINE

Filed Sept. 5, 1924

INVENTOR
George Smith
BY
Mayer, Warfield & Watson
ATTORNEY

May 1, 1928. 1,667,956
G. SMITH
FACING AND STACKING MACHINE
Filed Sept. 5, 1924 9 Sheets-Sheet 5
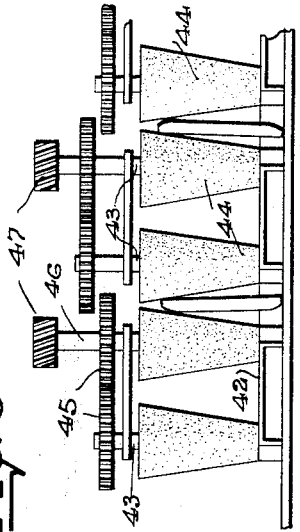
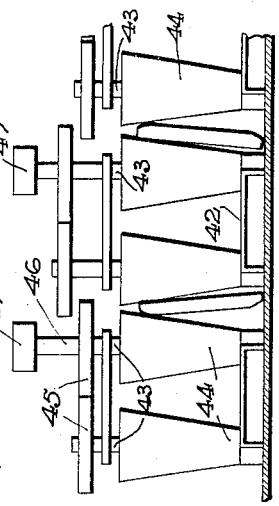
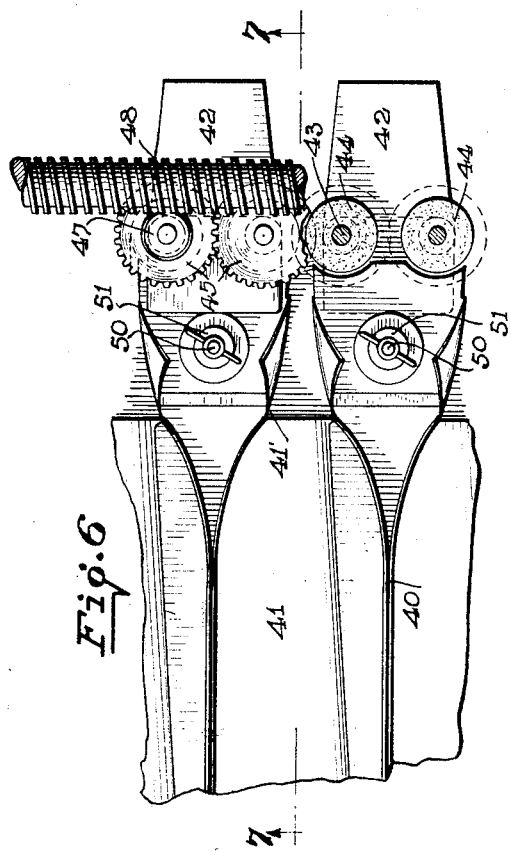
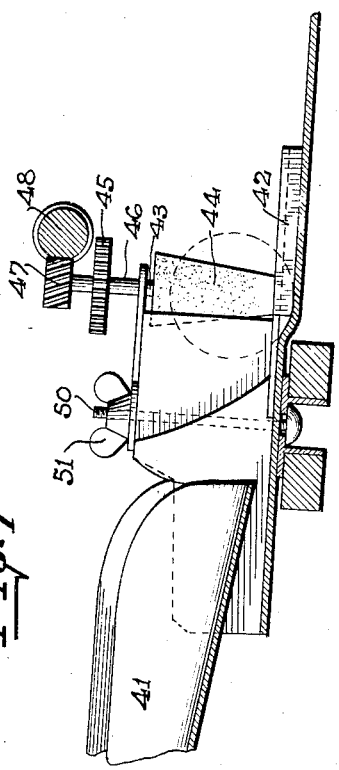
INVENTOR
George Smith
BY
Mayer, Warfield & Watson
ATTORNEY

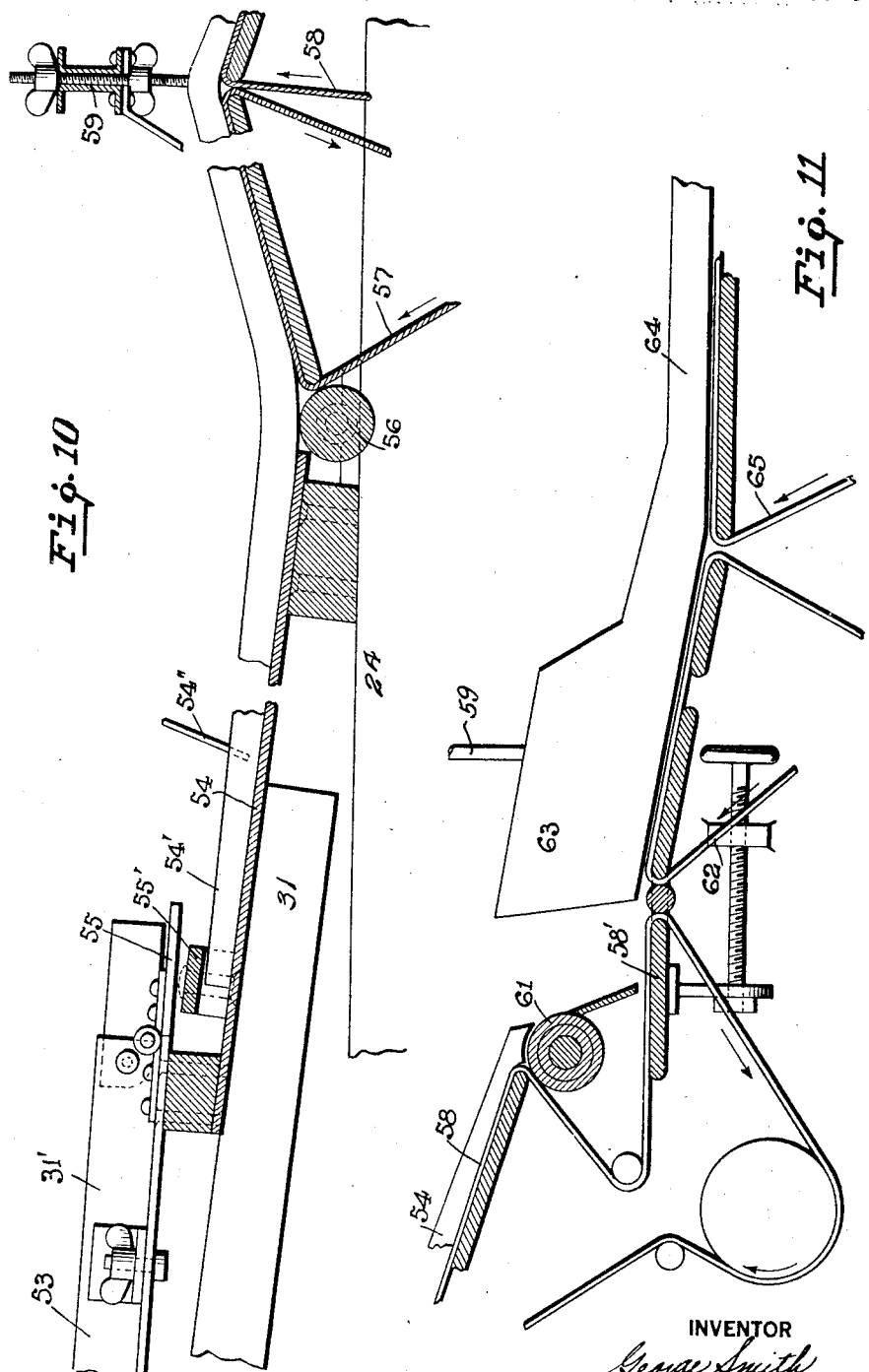

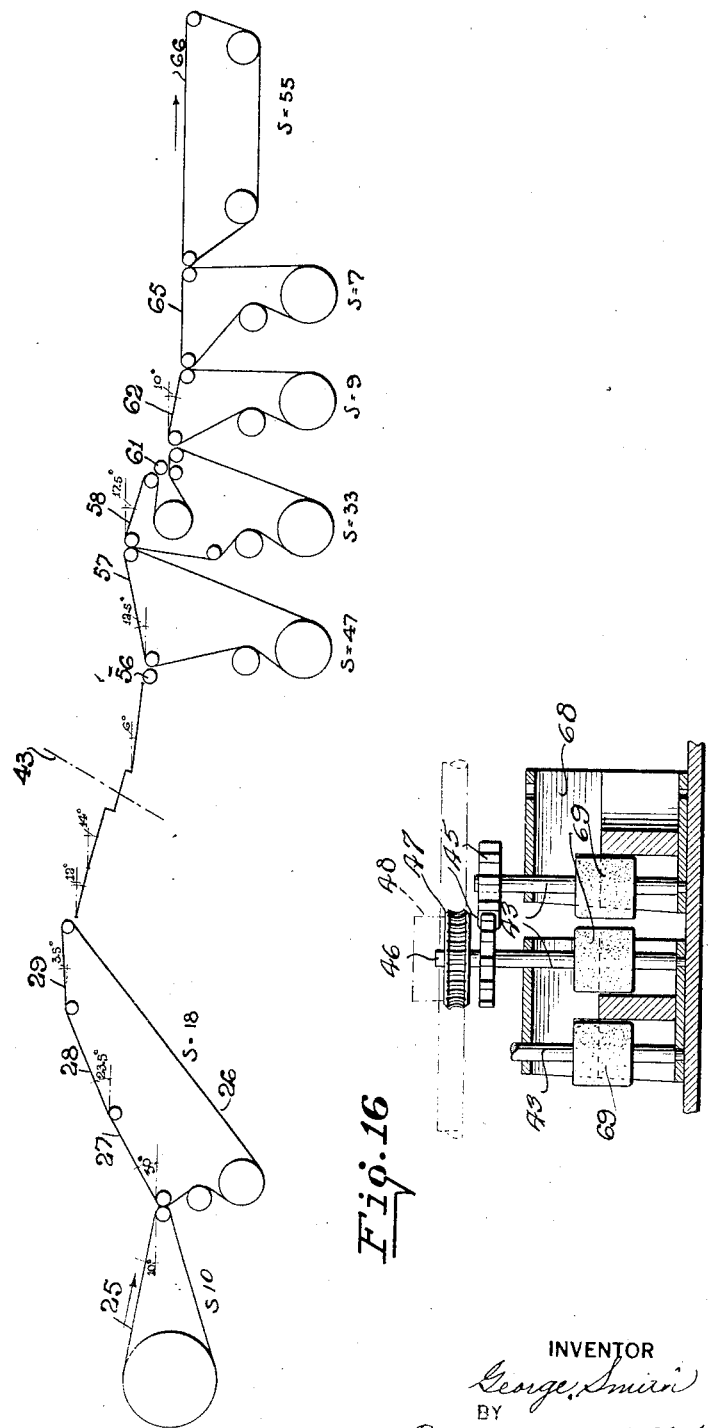

May 1, 1928.  G. SMITH  1,667,956
FACING AND STACKING MACHINE
Filed Sept. 5, 1924  9 Sheets-Sheet 8
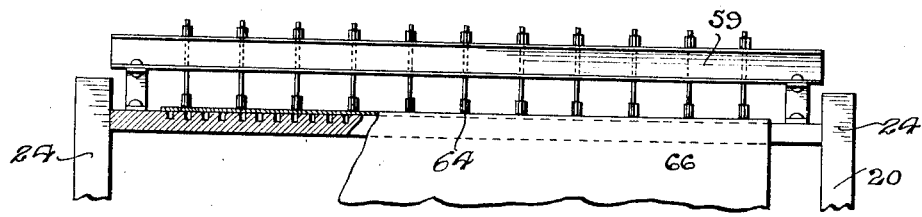
Fig.13
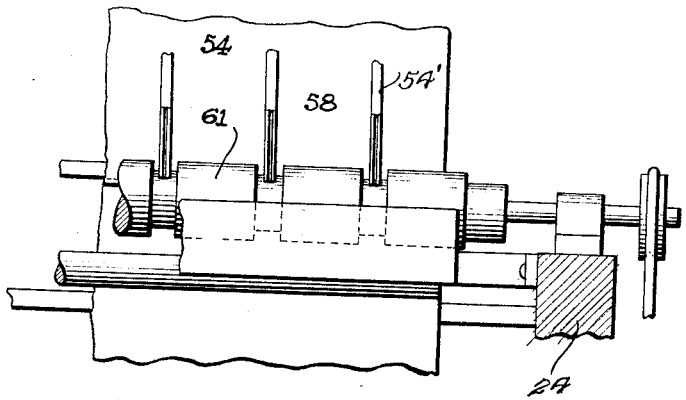
Fig.14
Fig.15
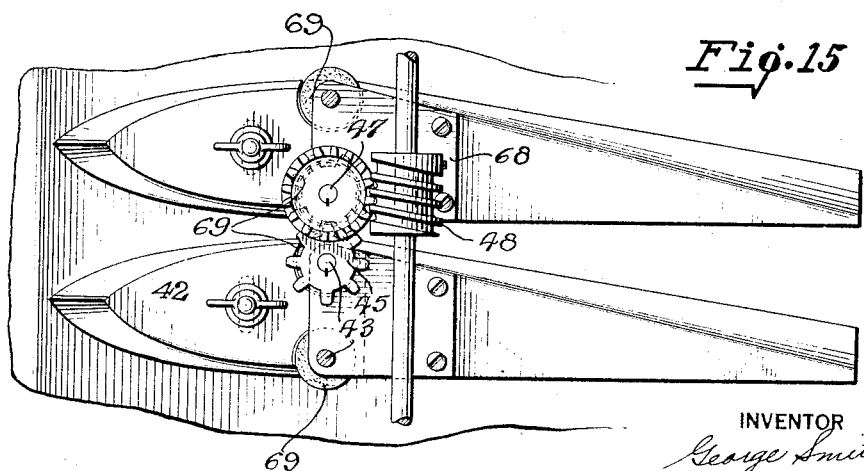
INVENTOR
George Smith
BY
Mayer, Warfield & Watson
ATTORNEY

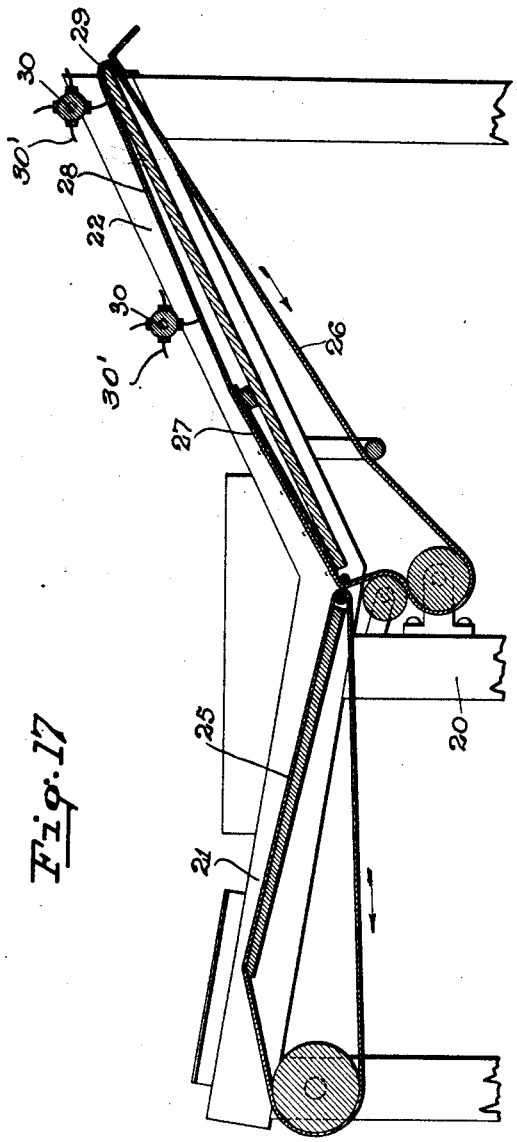

Patented May 1, 1928.

1,667,956

UNITED STATES PATENT OFFICE.

GEORGE SMITH, OF RICHMOND, VIRGINIA, ASSIGNOR TO NATIONAL BISCUIT COMPANY, OF NEW YORK, N. Y., A CORPORATION OF NEW JERSEY.

FACING AND STACKING MACHINE.

Application filed September 5, 1924. Serial No. 736,039.

This invention relates to a machine of improved construction particularly adapted for use by baking and similar industries, although the same may be used to advantage in numerous different instances while the invention may be employed for various specific purposes, it is particularly adapted to be utilized in connection with the finished products, as, for example, crackers, biscuits, cakes, and—in certain instances—candy and other confections, etc.

It is an object of the invention to provide an improved machine, by means of which, in connection with articles of the type aforenamed, a great amount of manual labor may be saved in the various steps to which they are necessarily subjected during the interval elapsing between their emergence or delivery from the oven or coating apparatus and their packing into the receptacles in which they are to be shipped or stored.

It is a further object of the invention to provide a machine of improved construction incorporating a mechanism, by means of which articles handled thereby will be automatically faced in a positive manner.

It is a still further object of the invention to furnish a device of the character stated, by means of which articles, for example, of the character named may be promiscuously received thereby, and which will automatically assort such articles.

Another object is to be predicated on the construction of an improved machine for automatically stacking the products or articles aforementioned.

Still another object is that of providing a machine to which crackers, biscuits and similar articles may be delivered in an unassorted condition and by means of which machine, in addition to other operations, these articles will be automatically assorted, faced and stacked.

An additional object is that of providing a machine which will efficiently perform the purposes for which it is intended and which will also be economically and readily manufactured and assembled.

Other objects of the invention will in part be obvious and will in part appear hereinafter.

The invention accordingly comprises the features of construction, combinations of elements, and arrangement of parts, which will be exemplified in the construction hereinafter set forth and the scope of the application of which will be indicated in the claims.

For a fuller understanding of the nature and objects of the invention reference should be had to the following detailed description taken in connection with the accompanying drawing, in which:

Figure 1 is a side elevation of a complete machine embodying one form of the present invention;

Fig. 2 is a fragmentary sectional view of the mechanism utilized in connection with the vibration of a table as embodied in the machine shown in the preceding figure;

Fig. 3 is a partly fragmentary plan view of the table aforementioned;

Figs. 4 and 5 are views similar to Fig. 3, but showing, respectively, portions of the machine which succeed that illustrated in the preceding figure;

Figs. 6 and 7 are plan and sectional side views, respectively, of portions of the facing apparatus utilized;

Figs. 8 and 9 are rear views of these portions of the machine, and illustrate the progressive feed of articles therethrough;

Figs. 10 and 11 are sectional side views of those portions of the machine illustrated in Figs. 3 and 4, respectively;

Fig. 12 is a diagrammatic side elevation, showing the various conveying mechanisms which are utilized in order to produce the various phases of feed;

Fig. 13 is a partly sectional end view of the machine;

Fig. 14 is a fragmentary partly sectional view of certain details of the stacking mechanism;

Fig. 15 is a plan view of a slightly different form of facing apparatus than that illustrated in Figs. 6 to 9;

Fig. 16 is a sectional view of the mechanism as illustrated in Fig. 15; and

Fig. 17 is a sectional side elevation of the forward or receiving and assorting portions of the machine.

Figure 5:
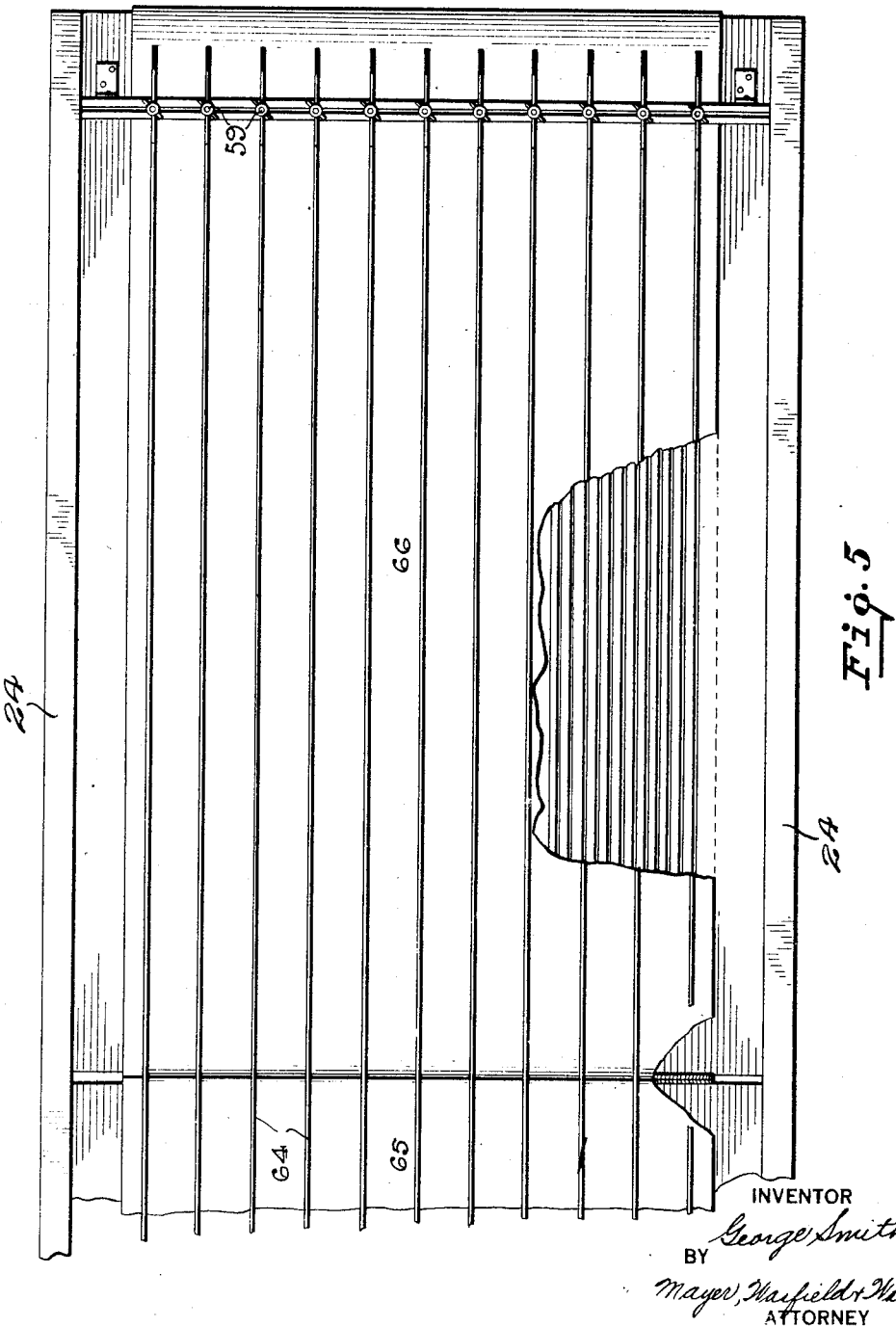

Referring primarily to Fig. 1, it will be noted that in the illustrated embodiment the machine includes a frame 20, which has a downwardly inclined article-receiving portion 21, a subsequent article-assorting portion 22 which is upwardly inclined, a body-portion 23 which, in the present instance, supports the separating, spacing, facing and distributing mechanisms; and an extension 24 of the portion 23, which, according to the illustrated embodiment, supports mechanism serving to properly space, stack and deliver the articles, all of this mechanism being hereinafter more particularly described.

At this time it is to be understood that the various portions of the frame do not necessarily have to be inclined, but in the present instance, they have been so shown in that, by thus constructing this supporting member, the mechanism carried thereby may be more conveniently mounted to extend in the various planes desired.

Referring to Fig. 12 as well as Fig. 1, it will be noted that the receiving portion of the machine comprises, in the present instance, nothing more than a downwardly inclined endless conveyor 25, upon which the articles to be arranged may be promiscuously distributed in any desired manner, as, for example, by dumping thereon pans containing the same, it being appreciated that the upper walls of the receiving portion 21 of the frame act as retaining members in order to prevent any of the articles spilling from the sides of the conveyor. These articles are brought by the conveyor 25 into contact with the conveyor 26, the upper face of which is preferably divided into three portions, 27, 28 and 29, these portions being successively of less acute inclination. Arranged above the upper faces of this conveyor are two shafts 30, each of which carries fingers or strips 30' for a purpose hereinafter to be brought out.

At the rear end of the conveyor 26 there is provided a mechanism, by means of which the separating, partial spacing, facing and distributing operations are accomplished, it being noted that the crackers or other articles are delivered to this mechanism by means of a chute positioned between the same and the conveyor. In the present instance, this mechanism is mounted upon a table 31, which, by means of links 32 is rockingly connected with the body 23 of the frame, it being noted that the mode of support of this table is such that it preferably inclines downwardly throughout its entire length. Adjacent its forward end the surface of the table is subdivided preferably by using a number of guide-members 33 to provide a series of channels. At this point the table is also preferably formed with a number of openings 34, through which crumbs and other portions which have become detached from the articles may be eliminated, and, with a view to permitting the width and angular disposition of the channels to be varied, it will be observed that the guide-members 33 are preferably secured to the table in such a manner that they may be adjustable. While this adjustment may be accomplished by any desired expedient, it will be noted in the present instance that each of the guide-members carries a pair of pins 35, which are adapted to be passed through openings 36 formed in the table top at this point. These openings are divided into two series, the individual openings being closely spaced, the different series of openings being separated a distance equal to the distance extant between the pins 35, so that, by disposing the latter within the proper openings, the channels may be given any desired width or angle.

As before brought out, the table 31 is mounted for movement and in order to vibrate the same, any desirable mechanism may be utilized. One form which this mechanism may take has been illustrated in Fig. 2, in which a shaft 37 has been shown as mounting a crank provided by an eccentric 38, one end of a pitman 39 being attached to this crank, and the opposite end of this member being secured to one of the links 32, so that, if the shaft 37 is rotated, the desired movement will be imparted to the table.

Immediately to the rear of this portion of the table there is provided a series of chutes 41 formed by the use of ribs 40 and having protuberances 41', it being noted that the rib members are so shaped that the mouth of each chute will be in the nature of a shallow flaring channel so that no difficulty will be experienced in introducing thereinto even a flat article lying upon and moving over the table deck. The bodies of these ribs are so formed that at least one of the channel walls increasingly extends at a more acute degree of inclination toward its rear end, so that, again assuming the flat article to be passing through the channel, it will be obvious that the former will assume more and more of a perpendicular position within the same. A series a mounting members 42 are so arranged in the present exemplification that one edge of the same forms virtually a continuation of one face of a rib member 40, the opposed face of the adjacent rib member being continued in the form of the opposed wall of the next adjacent mounting member, each of these members 42 carries a pair of rotatable shafts 43 mounted slightly to the rear of each of its side edges, and equal-sized rollers 44, which are preferably conical and symmetrical with each other and made of sponge rubber or other suitable material, are carried by each of these shafts and project beyond the side walls or edges aforementioned. In order to positively drive the shafts, and consequently, the rollers, any desirable mechanism may be utilized, as, for example, each shaft may be simultaneously driven by the use of gears 45, while one of the shafts of each pair is extended as at 46, and carries at its upper end a worm-wheel 47. This latter member is in turn engaged by one of a series of worm-portions 48 carried by a driving shaft 49, so that, upon this shaft being rotated, the worm-wheels 47 will be turned to simultaneously revolve each pair of rollers, all of which latter are moved in synchronism.

It is here to be noted that in the present instance the rollers may be adjusted by varying the distance between the same, and also varying the distance between adjacent mounting members 42. This is accomplished, for example, by securing each of the latter in position by means of a bolt 50 carrying at its upper end a wing-nut 51, having its body extending through a transverse slot in the member 42 or in the plate or framework supporting the same. It will be understood, however, that the foregoing adjustment is merely one way of varying the distance between the parts in order, for example, to accommodate different thicknesses and diameters of articles. The same effect might be achieved in numerous different manners, which are thought to be so obvious as to render it unnecessary to here describe the same in detail. It will also be observed, reference being particularly had to the type of facing apparatus illustrated in Figs. 6 to 9, that the rollers may have reduced end-portions extending downwardly, the axis of rotation of each of these rollers, i. e., the angular disposition of the shafts 43 upon which they are mounted, being such that the rollers will be inclined toward the rear end of the machine and with respect to the table deck, it being furthermore observed that the rear ends of the chutes 41 terminate at points spaced from the rollers 44 and at points above the supporting surface adjacent the same. In order to furnish the distributing mechanism, it will be noted, as in Figs. 3 and 10, that at a position to the rear of the roller, and adjacent the side edges of the table 31, a pair of plates constituting adjustable diverting members 52 may be provided, which plates will serve to cause the articles to be diverted into a common channel at the rear end of the table and defined by the upper surface of the same and the side walls formed by a second pair of adjustably mounted plates 53. At the rear edge of the table a hinged flap 55 has been provided, as has been best shown in Figs. 3 to 10, and it will be appreciated that when the flap is in the position illustrated the articles are free to move from the table to a ledge 54, but upon the flap being swung to extend at right angles to the table deck it will prevent the discharge of articles from the latter to the ledge, so that parts of the mechanism to the rear of the table may be adjusted without interrupting the actions of the facing mechanisms.

Extending lengthwise of the ledge 54 are a number of partition members or separators 54', the table and ledge portions being movable with respect to the same. In order to guide these elements a slotted bar 55' may be associated with the ledge 54 and slidably accommodate the ends of the separators, it being appreciated that bars having differently spaced notches or slots are used according to the amount of distance which is to exist between the individual separators 54¹.

Adjacent the rear edge of this ledge is a roller 56, which has its axis slightly below the upper face of the ledge, its periphery extending slightly above this upper surface. In turn, to the rear of the roller 56 is an endless conveyor 57, which is inclined upwardly, and is in communication at its point of discharge with a further conveyor 58. As has been best shown in Figs. 4, 10 and 13, adjusting members 59 are attached one to each of the separators or partitions 54'. These adjusting members preferably include screw-threaded stems, the lower ends of which are secured to the separators, and the bodies of which pass through openings in a beam directly carried by the machine frame, and in order to retain the parts in properly adjusted position wing-nuts may be associated with the screw threads of these stems. These two conveyors, together with the roller 56 and the separators 54¹, constitute what has been termed the spacing mechanism.

Immediately to the rear of and above the discharge end of the conveyor 58, as has been clearly shown in Figs. 4 and 11, a roller 61 is provided, and beyond and below this roller is a conveyor 62, the upper face of which is divided into a series of channels by the employment of separating members 63. These separating members are continued as at 64 to extend over the upper face of a conveyor 65, which is provided to the rear of the conveyor 62, and this conveyor in turn discharges onto a conveyor 66 mounted to the rear thereof. The last described series of conveyors, including the roller 61, constitute what has been termed the stacking mechanism, and the rearward portion of the conveyor 66, which is subdivided into a series of channels by means of prolongations of the separator 64, provides the delivery mechanism.

In operation, as has been previously brought out, the articles to be assorted are suitably disposed upon the conveyor 25. Incident to the fact that this conveyor feeds toward the rear end of the machine, these articles are passed into contact with the conveyor 26. On this conveyor, due to the angular disposition of the same relative to the conveyor 25, and relative to the horizontal, an overlapping of the articles is prevented, but, if, due to certain unforeseen circumstances, some of these articles should come to improperly lie upon the conveyor 26, this objection will readily be cured incident to the provision of the fingers or strips 30' by the shafts 30. In other words, due to the fact that the fingers or strips carried by the shafts 30 are carried in such a manner that their outer edges will clear the conveyor 26 sufficiently to permit of the free passage of approximately one article thereunder, it will be obvious that if two or more articles should overlap each other the upper articles will be diverted until they finally assume a proper position upon the conveyor. Thus, no articles will overlap one another. As a consequence, if certain of the articles tend to overlap, they will be moved back, in that merely a single thickness of articles is capable of passing under the fingers or strips carried by these shafts. Thus, a single thickness of articles come to lie upon the upper face of the table 31 at points adjacent its forward edge, and due to the vibration to which this table is subjected, and the inclination of the same, the articles will move downwardly over its upper face and between the guides 33 provided for this purpose, it being obvious that in such movement any crumbs or other portions which are intermixed with the articles will drop through the openings 34.

While on the subject of the receiving and assorting end of the machine it should be borne in mind that if desired the inclination of the conveyor 26 may be such that articles placed thereon will automatically turn over in that they will be incapable of moving forwardly with the conveyor until they rest with their flat faces upon the same. Under certain conditions of operation, particularly where the articles have a pronounced convexed upper face, it has been found that a mechanism of this character will serve to face the articles, and where a machine is to be utilized to face articles having the configurations specified, it will be found that in certain instances the subsequent facing rollers aforedescribed may be dispensed with. This is particularly true where the upper face of the conveyor 26 presents a surface tending to induce this result.

Also, due to the fact of the inclined disposition of the table deck with respect to the horizontal, and furthermore due to the fact of the increasingly greater inclination of the table, as is exemplified by the base portion of the chutes 41 (this having been clearly shown in Fig. 12), the articles will be separated to a greater extent than the degree of separation which exists between them as they are carried by the conveyor 26.

Thus, the articles will now pass one by one into the individual chutes 41, and if by some unforeseen condition certain articles should overlap one another, it will be appreciated that due to the protuberances 41', or other desirable constructions which may be provided for this purpose, the rate of movement of the lowermost article will be retarded so as to permit the overlying one to pass the same in its travel toward the facing mechanism. The articles in their passage through the chutes will be caused to gradually assume a substantially perpendicular position, irrespective of whether they have entered the spaces between the ribs 40 with their faces upwardly or downwardly. The articles, on reaching the rearward ends of the chutes 41, will drop downwardly and outwardly to a position at which their lower edges will engage the upper face of the table, while their bodies will be gripped between the opposed faces of the conical rollers 44 in the manner shown in Fig. 8. In this connection the purpose of the drop at this point will be appreciated, in that the articles may move through the chutes under certain conditions at a somewhat greater rate of speed than the peripheral speed of the rollers, and by having the articles drop rearwardly and downwardly, they are almost immediately delivered to the rollers after they have left the chutes so that any objections incident to a jamming are obviated.

These rollers will be continuously rotating, and it is here to be noted that the peripheral speed of the same should be in excess of the speed of movement of the conveyor 26, so that no overfeeding of the articles will occur. After the articles have partially moved through the space between pairs of cooperating rollers, and, particularly, incident to the fact that these articles will either have domed upper faces or beveled edges, it will be found that the article will be twisted so that its upper face will incline downwardly, whereby, upon its release, it will drop in each instance with its upper face in contact with the upper surface of the table deck. This operation is to be predicated on the fact that the space between certain parts of the working faces of cooperating rollers will be so adjusted as to be always less than the thickness of the article to be faced, and furthermore, due to the fact that these rollers are of conical shape. In other words, and as has been clearly shown in Figs. 8 and 9, this construction and cooperation of the parts and the shape of the articles will result in the opposite faces of each article being subjected to unequal pressure to cause portions of the articles to act as levers and fulcrums therefor, and upon the discharge or release of the article from the rollers; the forcing of the same into position with its upper face extending downwardly will be further assured if the axis of rotation of the rollers is at an angle to the subsequent portion of the table deck, as has been indicated in Fig. 7. Summing up this operation, we have here the factor of the article being faced to incline in a certain manner, and being fed in such a manner that it is pressed downwardly upon a deck, so that it must necessarily fall with that face downward which has been inclined in that direction. It must also be borne in mind that the axes of the rollers are parallel to each other and in a plane which is normal to the perpendicular, thus permitting the article to topple in the direction in which its center of gravity is offset, i. e., in the direction of the bevel or domed face thereof. Where conical rollers of the nature illustrated are employed for gripping the article at substantially diametrically opposite points on the front and back faces thereof there is, in consequence, a force tending to turn the article about a horizontal axis tangent to the proper edge thereof. This action, supplemented by the use of the inclined axes, results in a positive facing operation. This action may further be emphasized, incident to the trip effect exerted upon the articles by those portions of the ribs which extend beyond the rollers.

The faced articles will now, in passing over the remaining portion of the table deck, be again properly distributed incident to the continued vibratory movement of the supporting surface and the association therewith of the guides 31', the action of which is supplemented by the use of the pins 54''. These pins, which have been shown in Fig. 10, will obviously act to divert any article such as a cracker to have its body wholly disposed within a channel in the event that such article passes down a chute with part of its body supported upon the upper edge of one of the separators 54'. The articles are fed from this portion of the apparatus by the roller 56, which transfers them onto the conveyor 57, where they will again be properly moved toward the rear end of the machine in single alignment. In such rearward movement they will be fed by the conveyor 58 onto the roller 61 and it will be noted that the aforementioned conveyor has an adjustable extended portion 58' by means of which any article improperly fed by the roller 61 will be passed along to the conveyor 62.

The roller 61 moves at a relatively high rate of speed, and, as a consequence, the articles passing thereover are thrown toward the rear end of the machine an equal distance and dropped downwardly upon the conveyor 62, which moves at a relatively slow rate of speed. As a consequence, it will be found that the rows of articles within the channels provided between the separators 63 and upon the conveyor 62 will slightly overlap, and this overlapping will be emphasized into the creation of an actual stacking when the articles pass onto the conveyor 65. This is due to the fact that this latter conveyor in turn moves slower than the conveyor 62, thus causing the crowding of the articles upon the same, and the final stacking operation is achieved when the articles move onto the conveyor 66, which moves at an even slower rate of speed than the conveyor 65, which action is desired, as aforestated, in order to produce even more pronounced stacks, and furthermore, in order to have the articles move at a speed at the delivery end of the table which will allow ample margin for an operator to remove the same conceding that this operation is performed by hand.

While on the subject of relative speed of movement and varying degrees of inclination, attention is invited to Fig. 12, in which it will be noted that the conveyor 25 is inclined downwardly through an angle of 10° and has a speed of, for example, 10 feet per minute. The faces 27, 28 and 29 of the conveyor 26, on the other hand, are inclined upwardly through angles of 30°, 23.5° and 3.5°, respectively, while this conveyor has a speed of 18 feet per minute. The upper surface of the forward part of the table 31 is inclined through an angle of 12°, which angle is increased to 14° in the channels 41. It is of interest to note that the table is oscillated 342 times per minute, and it will of course be appreciated that, according to the angle at which the links 32 are initially set, more or less desirable conditions of feed may be accomplished. The axis of the various rollers are preferably set to be inclined at an angle of 60° and that portion of the table deck which is to the rear of these rollers may be inclined downwardly through an angle of 6°, and have a speed of 172 revolutions per minute. The roller 56 may have a peripheral speed of approximately 60 feet per minute and the conveyor 57 moves upwardly through an angle of 12½°, and at a speed of 47 feet per minute, while the conveyor 58 moves downwardly through an angle of 17.5°, at a speed of 33 feet per minute, so that any tendency of the articles to become too widely separated before reaching the roller 61 will be avoided. The conveyor 62, which receives the articles from the rollers 61, the latter having a peripheral speed of approximately 25 feet per minute, inclines downwardly through an angle of 10°, and moves at a speed of 9 feet per minute, while both the conveyors 65 and 66 may move through a horizontal plane and progress at speeds of 7 and 5.5 feet per minute, respectively.

It will be understood that the foregoing degrees of inclination and speeds may be varied to best meet the conditions encountered, and the same are merely given by way of suggestion.

Any desirable form of driving mechanism may be utilized in order to actuate the various conveyors, rollers, etc., and likewise, the conveyors, etc., may be maintained under proper tension.

Finally, with reference to the structure illustrated in Figs. 15 and 16, it will be noted that the same includes mounting members 68, which correspond to the ribs 40 and members 42, and are provided with spaces adapted to receive facing rollers 69. These rollers, instead of being conical, are cylindrical, but may, of course, be driven by a form of mechanism similar to that described in connection with the structure illustrated in preceding figures. These rollers terminate above the table deck, preferably at such a distance that an article, as for example a cracker gripped between the same, will have the major part of its body extending below the lower edges thereof. Thus, the rollers will extend above the upper arcs of a biscuit, conceding that articles of this nature are being handled by the machine, and that roller which contacts with the top face of the biscuit will tend to shift the lower edge of the same over toward the flat-bottom engaging roller to thus initiate the facing operation, which will be consummated by the biscuit falling upon its top as it leaves the rollers.

In addition to these factors it must be borne in mind that for the reason that that roller which contacts with the domed or beveled article faces naturally traverses a greater amount of surface than the cooperating roller, the article is given a slight twisting action as it is projected from between the rollers, and consequently, due to the fact that it is in frictional engagement with the table deck; and, furthermore, for the reason that the direction of twist is always toward the upper face of the article, the latter will necessarily fall face downward.

In concluding, it is to be understood that this application is a continuation in part of my application Serial No. 676,615, on facing and assorting machines, filed November 23, 1923.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. An article-handling machine, including an article-facing runway, and a substantially upright roller mounted on each side of the runway.

2. A machine of the class described, including, in combination, means providing a receiving surface, a pair of conical rollers having yielding contact peripheries adapted to engage one with each of two faces of a flat article which has one of its faces beveled, and means for feeding articles to said rollers.

3. The method of facing flat articles each having an edge- or face-portion extending at an angle to the other face thereof, which method includes the forward feeding of such articles while resting upon their edge-portions, the subsequent continued and positive feeding thereof, the discharging of said articles upon a receiving surface with their bodies extending at an angle to the direction of feed and with their edge- or face-portions extending forwardly and in contact with the receiving surface, and in exerting downward pressure upon said articles at the time of their discharge in order to press them firmly into contact with the receiving surface.

4. A biscuit-facing machine, including means providing a supporting surface for biscuits, means for engaging the biscuit while so supported for causing the same to assume a predetermined position and for forcing the body thereof towards said surface and thereupon releasing said biscuit, whereby the latter will come to lie in predetermined position upon said supporting surface.

5. A biscuit-facing machine, including means providing a supporting surface for biscuits, spaced guide members between which said biscuits are adapted to move, said guide members causing said biscuits to assume a position at which they rest upon their edges, and a pair of conical rollers adjacent said guide members and engaging a biscuit resting in such position, said rollers causing said biscuit to assume a position corresponding to other biscuits previously passed between said rollers.

6. A biscuit-facing machine, including a deck member, means for rocking said member, means for delivering biscuits to said member, a pair of facing rollers mounted upon said deck member, means for driving the rollers, and means for guiding the biscuits to a position between said rollers, the movement of said deck causing said biscuits to be advanced over the same and to said guiding means.

In testimony whereof I affix my signature.

GEORGE SMITH.